United States Patent [19]

Zanella, deceased et al.

[11] Patent Number: 5,216,121

[45] Date of Patent: Jun. 1, 1993

[54] PROCESS FOR FACILITATING THE HANDLING OF TACKY POLYMERS DURING THEIR POLYMERIZATION

[76] Inventors: Giuseppe Zanella, deceased, late of Ferrara; Roberto Zanella, Heir, Via della Paglia, 14, 44100 Ferrara; Zanella, Heir, Vittorio, Via Zucchi, 22, 40068 San Lazzaro di Savena (Bolgna); Marco Zanella, heir, Piazza Cavalieri di V. Veneto, 20090 Buccinasco (MI), all of Italy; Giuseppe R. Palmese, 374 Hanover St., Yorktown Hts., N.Y. 10598

[21] Appl. No.: 614,077

[22] Filed: Nov. 13, 1990

[51] Int. Cl.$^5$ .......................... C08F 6/10; C08F 10/04; C08F 10/06

[52] U.S. Cl. .................................. 528/501; 528/484; 523/340; 523/342

[58] Field of Search ................. 528/501, 484; 523/340, 523/342

[56] References Cited

U.S. PATENT DOCUMENTS

| | | | |
|---|---|---|---|
| 2,964,516 | 7/1957 | Henderson | 528/501 |
| 3,055,879 | 9/1962 | Wride | 528/501 |
| 3,600,371 | 8/1971 | Marwil | 528/501 |
| 4,168,373 | 9/1979 | Nickerson | 523/340 |
| 4,184,036 | 1/1980 | Shiomura et al. | 528/501 |
| 4,424,341 | 1/1984 | Hanson et al. | 528/501 |
| 4,439,601 | 3/1984 | McCurdy et al. | 528/481 |
| 4,460,545 | 7/1984 | Jouffroy et al. | 525/53 |

FOREIGN PATENT DOCUMENTS

| | | | |
|---|---|---|---|
| 1109494 | 9/1981 | Canada | 528/501 |
| 2826196 | 12/1979 | Fed. Rep. of Germany | 528/501 |
| 9053507 | 3/1984 | Japan . | |
| 1000551 | 8/1965 | United Kingdom | 528/501 |

Primary Examiner—Paul R. Michl
Assistant Examiner—Andrew E. C. Merriam
Attorney, Agent, or Firm—Kenyon & Kenyon

[57] ABSTRACT

The invention includes a process for facilitating the handling of tacky polymers (specifically amorphous polypropylene and amorphous ethylene propylene co-polymers) during their polymerization comprising:

a. preparing a mixture of a tacky polymeric material and a carrying phase for said polymeric material at a temperature and pressure sufficient to maintain said carrying phase as a liquid;

b. flashing said mixture to a flash pressure low enough to effect vaporization of said carrying phase, as well as autorefrigeration of said polymeric material to its non-tacky, easy-handling temperature range; and c. separating the thus autorefrigerated polymeric product from its carrying phase wherein said carrying phase will dissolve sufficient polymer to form a liquid mixture.

The invention also includes an apparatus for carrying out this process.

17 Claims, 4 Drawing Sheets

PROCESS FOR FACILITATING THE HANDLING OF TACKY POLYMERS DURING THEIR POLYMERIZATION

BACKGROUND OF THE INVENTION

Atactic or amorphous polypropylenes (APP), are known for their propensity for agglomeration, fouling, caking or, more simply, for their tackiness. This material was once in oversupply as it was the unwanted byproduct of isotactic polypropylene (IPP) production. During the past ten years, however, it has gained a considerable market as a principal component of modified bitumen one-ply roofing. Today the APP material most widely used by the roofing industry is the amorphous byproduct of isotactic polypropylene, which is a mixture of APP, IPP and amorphous ethylene/propylene copolymer and is herein referred to as byproduct polypropylene (BPP).

BPP is now becoming scarce since IPP catalysts used currently produce only negligible quantities of this byproduct. Suppliers of BPP are therefore turning their efforts towards production, as a staple commercial product, of APP and of materials similar in composition and physical characteristics to the BPP currently used by the roofing industry. U.S. Pat. No. 4,777,216 to V. Busico, for example, discloses a method for the synthesis of polymeric polyolefin alloy materials which have a consistent and reproducible composition similar to BPP. A major drawback in the industrial scale production of materials like APP is the difficulty created by their tackiness at the separation, discharge and packaging stages of the production process. As can be imagined, tacky materials tend to stick to process internal parts, such as vessel, pipe or valve walls, and to form agglomerates which present dangers of encrustment and clogging.

SUMMARY OF THE INVENTION

It is the object of this invention to provide a process which facilitates the handling of tacky materials such as APP at the stage in their production in which these materials are separated from the monomer or solvent.

Tacky polymeric materials tend to be more manageable at colder temperatures. In fact, tackiness becomes minimal as the temperature nears or goes below the glass transition temperature. The present invention therefore includes a process by which a tacky polymeric material can be cooled to within its non-tacky, easy-handling temperature range during its separation from the liquid monomer and/or solvent. It has now been discovered that a pressurized mixture of the polymeric material in its liquid monomer and/or solvent may be cooled practically instantaneously to the polymeric materials' non-tacky, easy handling temperature by flashing the reaction mixture in such a way that the heat of vaporization necessary for the phase change of the monomer and/or solvent is provided by the polymeric product. This practically instantaneous cooling is referred to herein after as autorefrigeration. Such cooling of large quantities of material in a very small time period cannot be accomplished in a practical manner by mechanical refrigeration. The process herein disclosed comprises:

a. preparing a mixture of a tacky polymeric material and a carrying phase for said polymeric material at a temperature and pressure sufficient to maintain said carrying phase as a liquid;

b. flashing said mixture to a flash pressure low enough to effect vaporization of said carrying phase, as well as autorefrigeration of said polymeric material to its non-tacky, easy-handling temperature range;

c. separating the thus autorefrigerated polymeric product from its carrying phase The present invention also includes apparatus, shown in FIGS. 3-5 for carrying out the process.

SUMMARY OF THE FIGURES

In describing the invention, reference will be made to the annexed drawings wherein.

DETAILED DESCRIPTION OF THE INVENTION

The process and apparatus disclosed herein are suitable for application in the production processes of materials which are tacky and thus difficult to handle at usual process temperatures but which lose their tackiness at lower temperatures. Examples of suitable polymers are APP, amorphous ethylene/propylene copolymers, and polyisobutylene products. The non-tacky, easy-handling temperature can be easily ascertained for each polymeric product and is typically in the vicinity of that polymeric product's glass transition temperature.

The invention is particularly well suited for the production of tacky materials such as those mentioned above which can be polymerized in the liquid phase—slurry or solution.

Figure 1:
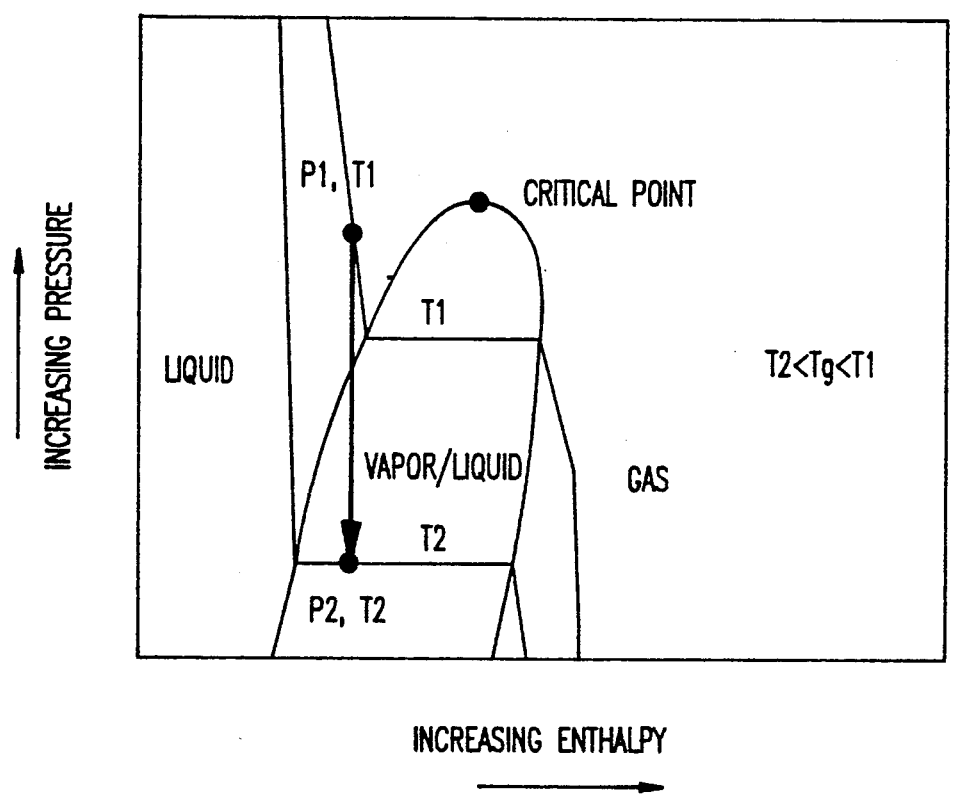
FIG. 1 is a schematic representation of a pressure-enthalpy diagram for a carrying phase suitable to this invention showing adiabatic decompression of the pure carrying phase.

The carrying phase, either monomer or solvent, must be able to dissolve sufficient polymer to form a liquid mixture: the solution or slurry. Furthermore, it must be comprised of a liquid which, when decompressed adiabatically, reaches or passes through vapor-liquid equilibrium temperatures within the polymeric product's non-tacky, easy-handling temperature range. FIG. 1, a schematic of a pressure-enthalpy diagram for the carrying phase illustrates this condition. Adiabatic decompression from $P_1$ and $T_1$, the initial pressure and temperature, to $P_2$ brings the carrying phase within the vapor-liquid equilibrium envelope to a temperature, $T_2$ below the polymeric product's glass transition temperature, $T_g$. A particularly good example of a suitable carrying phase is propylene in the polymerization of polypropylene. At typical slurry polymerization reaction temperatures and pressures, propylene is a liquid for which adiabatic decompression can be accompanied by a great decrease in temperature (i.e., well below $-50°$ C.).

Other examples of suitable carrying media are the lower olefins and mixtures thereof such as mixtures of propylene and ethylene in the copolymerization of ethylene/propylene copolymers; butylene in the polymerization of synthetic rubber; and mixtures of butylene and propylene in the copolymerization of butylene/propylene copolymers.

Figure 2:
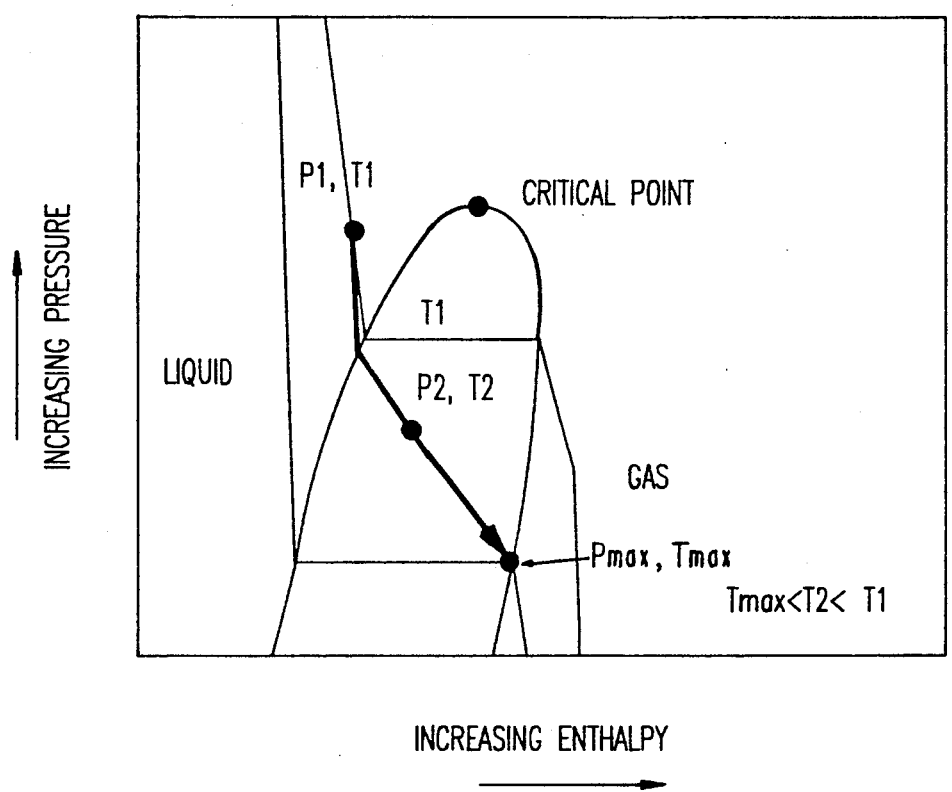
FIG. 2 is a schematic representation of a pressure enthalpy diagram for a carrying phase suitable to this invention showing adiabatic decompression of the carrying phase in the presence of polymer.

It is crucial to the invention that during decompression the carrying phase reaches or passes through vapor-liquid equilibrium. The extent to which polymer can be cooled depends on the initial and final pressures and the initial temperature and concentration of the polymer mixture. FIG. 2 schematically illustrates the state of the carrying phase as a polymer mixture of fixed concentration is adiabatically decompressed. For a given pressure, the difference between the enthalpy of the carrying medium in FIG. 2 and the enthalpy of the carrying medium decompressed adiabatically in its pure form, FIG. 1, is the enthalpy lost by the polymer as it is cooled. At point $P_2T_2$ in FIG. 2 the carrying medium is in a vapor-liquid equilibrium state having a substantial amount of liquid. As the pressure is decreased, the temperature is decreased and the enthalpic contribution of the polymer increases to the point where all liquid has been vaporized to its saturated vapor state. We define the pressure at which this happens as $P_{max}$ and the corresponding equilibrium temperature as $T_{max}$ (FIG. 2). For pressure greater than $P_{max}$ and under adiabatic conditions, liquid remains in the flashed mixture. For pressures less than $P_{max}$, the carrying phase is completely vaporized and the resulting gas is in a superheated state. Table 1 demonstrates this behavior for a 50/50 weight % propylene/polypropylene slurry flashed from an initial temperature of 70° C. and an initial pressure of 40 ata (atmospheres absolute) to final pressures above and below $P_{max}$. The value of $P_{max}$ depends strongly on the initial polymer concentration and temperature and less significantly on the initial pressure. This is demonstrated in Table 2 where values for $P_{max}$ and $T_{max}$ have been calculated for varying initial values of propylene/polypropylene slurry concentrations, pressures, and temperatures.

The following descriptions of preferred embodiments serve to further explain and illustrate the invention but are not intended in any way to limit the scope thereof.

According to the simplest embodiment of the invention, the polymer mixture is flashed by decompressing it nearly instantaneously and therefore nearly adiabatically to a pressure at which the carrying phase is completely vaporized. The cooled polymeric product can be then easily separated from the carrying phase by withdrawing the vapor and recompressing it.

Figure 3:
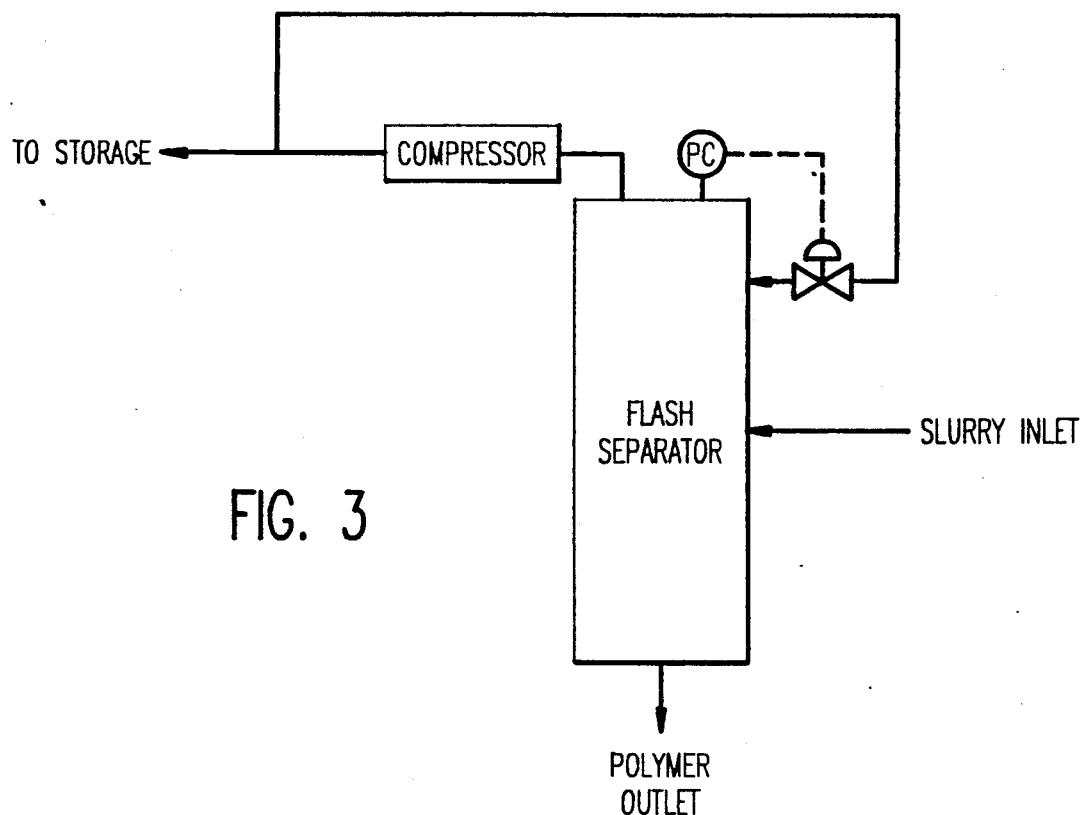
FIG. 3 shows an apparatus for separation of tacky polymers from slurries or solutions.

Complete vaporization of the carrying phase is accomplished by controlling the final pressure of the flashed mixture. Complete vaporization will occur as long as the flash pressure is below the maximum flash pressure for the given initial temperature, pressure and concentration. Furthermore, if flashing is controlled to a pressure below $P_{max}$, the final temperature will not exceed the equilibrium temperature corresponding to $P_{max}$. Table 2 shows that by varying the initial temperature and slurry concentration, $P_{max}$, and therefore the final temperature, $T_{max}$ can be controlled. The higher the initial temperature and concentration, the higher the temperature following decompression. Further control of the final temperature, $T_2$, is possible by flashing to pressures below $P_{max}$. For these cases the vapor will reach a superheated state at a temperature always below $T_{max}$. Table 3 reports the effect on $T_2$ of varying the final pressure $P_2$ below $P_{max}$ for a 50/50 weight % propylene/polypropylene slurry being flashed from a pressure and temperature of 40 ata and 70° C., respectively. The lower $P_2$ is, the lower the final polymer temperature will be. An apparatus is shown in FIG. 3 where the extent of cooling the polymer is controlled by simply varying the flash pressure and initial slurry/solution conditions.

If, given initial conditions, a final temperature higher than that corresponding to $P_{max}$ or a final pressure greater than $P_{max}$ is desired while ensuring that no part of the carrying phase remains liquid, a second embodiment may be adopted in which the polymer mixture is flashed to a pressure above its maximum flash pressure and heat is added to ensure complete vaporization of the carrying medium. For a 50/50 weight % propylene/polypropylene slurry at an initial temperature of 70° C, and an initial pressure of 40 ata, Table 4 reports the effects of varying flash pressure $P_2$ above $P_{max}$ on final temperature, $T_2$, and on the amount of heat, Q, necessary for complete vaporization of the carrying phase. Thus, for higher polymerization temperatures, higher flash pressures and greater amounts of energy must be added to ensure a liquid free product. While it is possible to introduce heat to the system by heating its containing surfaces, it is preferable to inject a controlled quantity of heated gas into the system. The apparatus shown in FIG. 4 accommodates this embodiment. A contacting device, such as the one shown in FIG. 4, allows for greater contact between the polymer mixture and hot gases during decompression and thus aids in the necessary heat transfer. Since, in this case, the carrying phase is also completely vaporized, the cooled polymer can also be separated from the carrying phase by withdrawing the vapor.

A more energy efficient embodiment of the invention reduces both the amount of vaporized carrying phase, which must be recompressed, and the amount of heat, which must be added to the flash mixture. This embodiment is a two stage process. In the first stage, the polymer mixture is flashed to a pressure above the maximum flash pressure so that part of the carrying medium remains liquid. Part of the liquid is removed at this stage. In the second stage, the remaining liquid is removed by the addition of heat, or further decompression or a combination of the two. Table 5 contains examples which demonstrate the energy saving capabilities of the two stage separation process. Three examples are shown for the separation of polypropylene from a 50/50 wt. % polypropylene/propylene slurry at 40 ata and 70° C. In all cases the final temperature is −20° C. The amount of heat added per kilogram of slurry and the amount of carrying phase removed in liquid form is reported. Example 1 represents a single stage operation where enough heat is added for complete vaporization. Example 2 is a two stage process in which liquid is removed in the first stage and heat is added during the second stage. Example 3 is a two stage process where the first stage is held at a slightly higher temperature and pressure, while liquid is removed, and complete vaporization of the remaining liquid occurs by flashing in the second stage. Comparison of these examples shows that the two stage processes can be more efficient. Furthermore, example 3, the two stage process where the final stage allows for vaporization by decompression, is the least costly with respect to energy. The slightly higher operating temperature of the first stage could be a disadvantage in this case. On the other hand, the higher temperature allows for a greater liquid concentration in the first stage which makes it easier for liquid withdrawal. The more liquid is withdrawn, the lower the costs for compression will be. An apparatus developed to accommodate this embodiment is shown in FIG. 5.

DETAILED DESCRIPTION OF THE DRAWINGS

Figure 4:
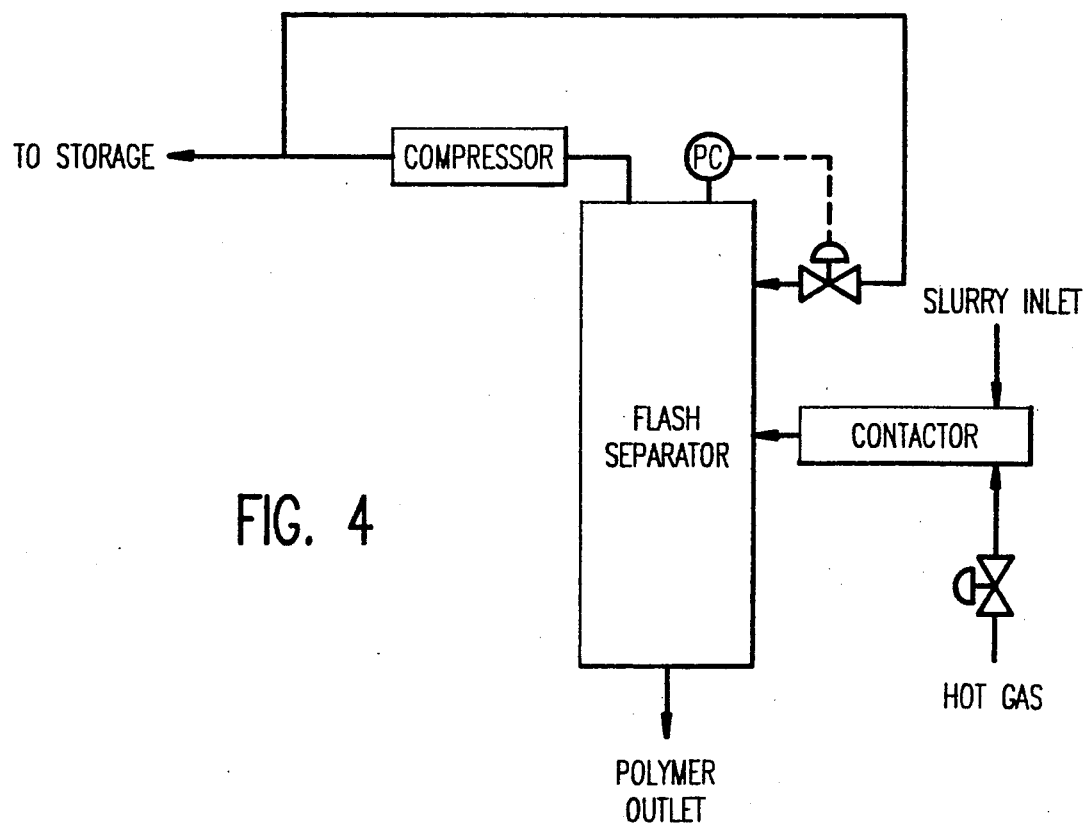
FIG. 4 shows an apparatus for separation of tacky polymers from slurries or solutions modified with a heating system.
Figure 5:
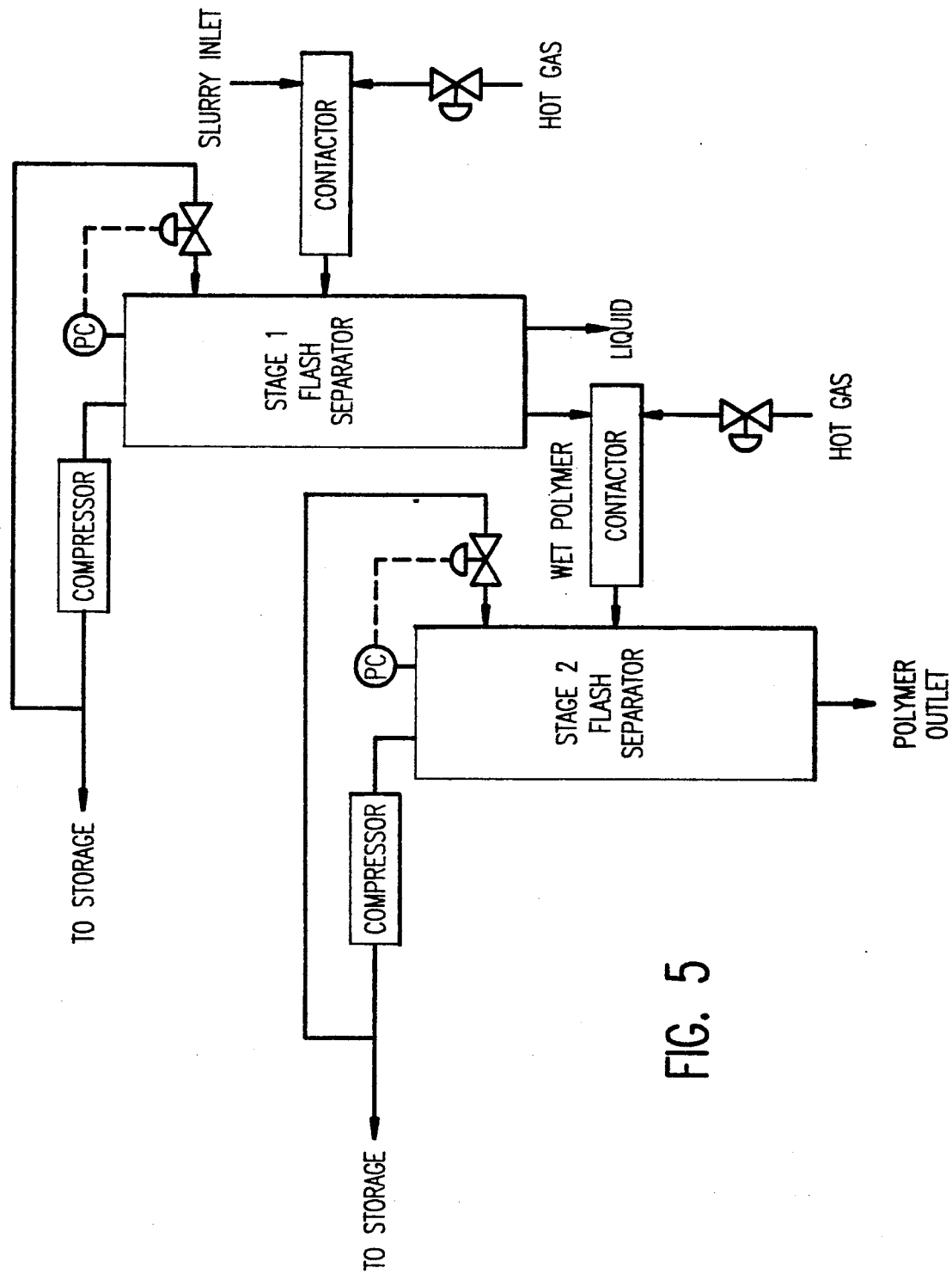
FIG. 5 shows an apparatus for an energy efficient two-stage separation process for slurries or solutions or tacky polymers.

The apparatus necessary to carry out the processes which have been described is shown in its preferred embodiments in FIGS. 3-5. In its simplest form, the apparatus consists of (1) a reaction vessel resistant to the pressures necessary to carry out the polymerization of the tacky polymeric material, which normally, as in the case for APP production, is at least the pressure necessary to liquify the monomer or solvent; and (2) a flashing apparatus connected to said reaction vessel resistant to and equipped with a means for maintaining the flash pressures and temperatures necessary to carry out the process of the invention. Following are the descriptions of FIGS. 3-5, the preferred embodiments.

FIG. 3 is a schematic representation of the apparatus necessary to carry out the simplest embodiment of the invention. A mixture comprised of a tacky polymer and a liquid carrying phase is released into the flash separator from a vessel in which the mixture has been kept at a temperature and pressure higher than that of the separator. The flash separator must be capable of withstanding pressures and cryogenic temperatures required by the process. Complete evaporation of the carrying phase in the separator is ensured by adequate control of the pressure in this vessel. As shown in FIG. 3, such control can be implemented by varying the flow rate of make-up gas to the separating vessel, provided that the compressor used to withdraw the gases from the separator is sized to compress at a rate considerably greater than that of the gases being introduced by the incoming polymer mixture. A means for the removal of polymer is connected to the separator.

FIG. 4 shows an apparatus designed to realize the second embodiment discussed in which higher liquid-free temperatures can be attained in the separation vessel by providing a means of rapidly heating the flashing polymer mixture stream. The apparatus being discussed is similar to the one shown in FIG. 3; however, a method for heating by controlled injection of hot air has been implemented. While it is possible for the mixture and the hot gas streams to enter the separating vessel directly, a contacting device has been employed to maximize thermal contact between the hot gas and flashing streams before entering the separating vessel. Pressure control is effected by the means previously discussed. A means for polymer removal is shown.

FIG. 5 shows an apparatus suitable for the disclosed two stage energy efficient process. The first stage is comprised of the following: a separation vessel capable of withstanding pressures and cryogenic temperatures prescribed by the process; pressure control; a method for heating; a modified outlet near the bottom of the tank for the removal of liquid; and an outlet for the removal of a highly concentrated polymer mixture. Although Examples 2 and 3 in Table 5 do not call for heating in the first stage, processes can be designed for which such heating is desired. As per FIG. 5 heat is introduced to the first stage separation vessel by injection of hot gas and slurry streams into a contacting device, and pressure is controlled as previously described. The requirements of the second stage are similar to those of the first stage with the exception that a means of removing liquid is not required and the outlet is designed for handling liquid-free polymer.

TABLE 1

Effect of Flash Pressure on Final State of Propylene
50/50 weight % propylene/polypropylene slurry;
$T_1 = 70°$ C.; $P_1 = 40$ ata

| Flash Pressure (ata) | State |
|---|---|
| 10 | 30% saturated liquor |
|    | 70% saturated vapor |
| 2.5 | 100% saturated vapor |
| 1 | 100% superheated gas |

TABLE 2

Effect of Initial Slurry Conditions on $P_{max}$ and $T_{max}$
50/50 weight % propylene/polypropylene slurry

| $T_1$ (°C.) | $P_1$ (ata) | C (wt. % PP) | $P_{max}$ (ata) | $T_{max}$ (°C.) |
|---|---|---|---|---|
| 50 | 40 | 50 | <1 | <−50 |
| 60 | 40 | 50 | 1.4 | −38 |
| 70 | 40 | 50 | 2.5 | −25 |
| 70 | 35 | 50 | 2.6 | −23 |
| 70 | 40 | 50 | 2.5 | −25 |
| 70 | 45 | 50 | 2.3 | −27 |
| 70 | 40 | 25 | <1 | <−50 |
| 70 | 40 | 50 | 2.5 | −25 |
| 70 | 40 | 67 | 9 | 25 |

TABLE 3

Effect of Varying Flash Pressure Below $P_{max}$ on Temperature
50/50 weight % propylene/polypropylene; $P_1 = 40$ ata,
$T_1 = 70°$ C. $P_{max} = 2.5$ ata

| $P_2$ (ata) | $T_2$ (°C.) |
|---|---|
| 2.5 | −25 |
| 2 | −27 |
| 1 | −29 |

TABLE 4

Effects of Varying Flash Pressure Above $P_{max}$ on Temperature
50/50 weight % propylene/polypropylene; $P_1 = 40$ ata,
$T_1 = 70°$ C. $P_{max} = 2.5$ ata

| $P_2$ (ata) | $T_2$ (°C.) | Q (kjoules/kg slurry) |
|---|---|---|
| 20 | 48 | 70 |
| 10 | 20 | 55 |
| 6 | 3 | 38 |
| 4 | −12 | 18 |
| 2.5 | −25 | 0 |

TABLE 5

Examples of Two Stage Separation Processes
50/50 weight % propylene/polypropylene; $P_1 = 40$ ata,
$T_1 = 50°$ C. $P_{max} = <<1$ ata

| Example | $P_{1st}$ (ata) | $T_{1st}$ (°C.) | $P_{2nd}$ (ata) | $T_{2nd}$ (°C.) | Q kjoules/ kg slurry | % carrier removed as liquid |
|---|---|---|---|---|---|---|
| 1 | 3.3 | −20 | — | — | 50 | 0 |
| 2 | 3.3 | −20 | 3.3 | −20 | 25 | 12.5 |
| 3 | 4.4 | −10 | 3.3 | −20 | 0 | 17.5 |

What is claimed is:

1. In a flashing process wherein a polymeric material is partially or completely separated from its carrying phase as a result of an instantaneous drop in pressure, the improvement comprising controlling the flashing parameters of a mixture of tacky polymer and its carrying phase so as to cool the polymer to a temperature within the polymer's non-tacky, easy handling temperature range.

2. The process of claim 1 wherein the flashing parameters are initial temperature, initial pressure, final pressure and polymeric product concentration.

3. The process of claim 1 wherein the final temperature of the polymer approaches the tacky polymer's glass transition temperature.

4. The process of claim 1 wherein the final temperature is close to or below the tacky polymer's glass transition temperature.

5. The process of claim 1, wherein the entire carrying phase is vaporized upon flashing.

6. The process of claim 1, wherein the carrying phase is only partially vaporized upon flashing and thus remains partially liquid.

7. The process of claim 6 wherein said remaining liquid carrying phase is completely vaporized by adding heat.

8. The process of claim 7 wherein said additional heat is introduced by injecting a controlled quantity of heated gas into said flashed polymer mixture.

9. The process of claim 6 wherein:
 i. said remaining liquid carrying phase is partially removed; and
 ii. The polymeric product mixture is flashed a second time to a flash pressure sufficiently low to effect the total vaporization of the remaining liquid phase.

10. The two stage process of claim 9 wherein step ii, the vaporization of the finally remaining liquid carrying phase, is accomplished by adding heat rather than by flashing.

11. The process of claim 10 wherein the additional heat is added by heating said flashed mixture's or slurry's containing surfaces.

12. The process of claim 1 wherein the tacky polymeric material is atactic polypropylene and the carrying phase includes liquid propylene.

13. The process of claim 1 wherein the tacky polymeric material is an amorphous ethylene/propylene copolymer and the carrying phase includes a mixture of liquid propylene and ethylene.

14. In a flashing process wherein a polymeric material is partially or completely separated from its carrying phase as a result of an instantaneous drop in pressure, the improvement comprising controlling the flashing parameters of a mixture of atactic polypropylene and propylene so as to cool the atactic polypropylene to a temperature close to or below the glass transition temperature of the atactic polypropylene.

15. The process of claim 2 wherein the final temperature is obtained by varying one or a combination of initial temperature, initial pressure, final pressure and polymeric product concentration.

16. The process of claim 1 wherein the tacky polymeric material is polyisobutylene and the carrying phase includes isobutylene.

17. The process of claim 1 wherein the tacky polymeric material is a butylene/propylene copolymer and the carrying phase includes a mixture of butylene and propylene.

* * * * *